(12) United States Patent
Toda (10) Patent No.: US 11,372,116 B2
(45) Date of Patent: Jun. 28, 2022

(54) POSITIONING CONTROL DEVICE

(71) Applicant: CASIO COMPUTER CO., LTD., Tokyo (JP)

(72) Inventor: Naoto Toda, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 542 days.

(21) Appl. No.: 16/246,949

(22) Filed: Jan. 14, 2019

(65) Prior Publication Data
US 2019/0227180 A1    Jul. 25, 2019

(30) Foreign Application Priority Data

Jan. 19, 2018   (JP) .............................. JP2018-006960

(51) Int. Cl.
  *G01S 19/49*   (2010.01)
  *G01S 19/28*   (2010.01)
  *G01S 19/34*   (2010.01)

(52) U.S. Cl.
  CPC .............. *G01S 19/49* (2013.01); *G01S 19/28* (2013.01); *G01S 19/34* (2013.01)

(58) Field of Classification Search
  CPC .... G01S 19/28; G01S 19/49; G01S 5/01–012; G01S 19/396
  See application file for complete search history.

(56) References Cited

U.S. PATENT DOCUMENTS

| | | |
|---|---|---|
| 6,686,877 B2 | 2/2004 | Ishigaki et al. |
| 7,065,320 B2 | 6/2006 | Ishigaki et al. |
| (Continued) | | |

FOREIGN PATENT DOCUMENTS

| | | |
|---|---|---|
| JP | 2000321346 A | 11/2000 |
| JP | 2002156438 A | 5/2002 |
| (Continued) | | |

OTHER PUBLICATIONS

NPL—English Translation of JP2004184121A (Year: 2021).*
(Continued)

*Primary Examiner* — Bernarr E Gregory
*Assistant Examiner* — Fred H Mull
(74) *Attorney, Agent, or Firm* — Holtz, Holtz & Volek PC (57) ABSTRACT

An electronic device includes a GPS unit, a GPS information acquisition unit, a sensor information acquisition unit, and a reception condition determination unit. The GPS unit receives a radio wave from at least one of a plurality of positioning satellites. The GPS information acquisition unit acquires ephemeris information by the GPS unit and acquires satellite arrangement information of each of the plurality of positioning satellites acquiring the ephemeris information. The sensor information acquisition unit acquires geographical condition information of a current location at which the electronic device is present. The reception condition determination unit identifies the number of positioning satellites that the receiving unit can capture at the current location among the plurality of positioning satellites acquiring the ephemeris information based on the geographical condition information of the current location and the satellite arrangement information.

15 Claims, 8 Drawing Sheets

(56) References Cited

U.S. PATENT DOCUMENTS

| | | | |
|---|---|---|---|
| 8,305,264 B1* | 11/2012 | Jones | G01S 19/46 |
| | | | 342/357.25 |
| 2007/0262900 A1 | 11/2007 | Haverkamp et al. | |
| 2009/0278738 A1* | 11/2009 | Gopinath | G01S 19/47 |
| | | | 342/357.74 |
| 2018/0196143 A1 | 7/2018 | Nishi et al. | |

FOREIGN PATENT DOCUMENTS

| | | |
|---|---|---|
| JP | 2004184121 A | 7/2004 |
| JP | 2009085662 A | 4/2009 |
| JP | 2009243940 A | 10/2009 |
| JP | 2009537015 A | 10/2009 |
| JP | 2010223594 A | 10/2010 |
| JP | 2015155802 A | 8/2015 |
| JP | 2016017904 A | 2/2016 |
| JP | 2017116443 A | 6/2017 |
| WO | 2017010230 A1 | 1/2017 |

OTHER PUBLICATIONS

NPL—English Translation of JP2016017904A. (Year: 2021).*

Japanese Office Action (and English language translation thereof) dated Feb. 18, 2020 issued in Japanese Application No. 2018-006960.

* cited by examiner

POSITIONING CONTROL DEVICE

CROSS-REFERENCE TO RELATED APPLICATIONS

This application is based upon and claims the benefit of priority under 35 USC 119 of Japanese Patent Application No. 2018-006960 filed on Jan. 19, 2018, the entire disclosure of which, including the description, claims, drawings, and abstract, is incorporated herein by reference in its entirety.

FIELD OF THE INVENTION

The present invention relates to an electronic device.

BACKGROUND OF THE INVENTION

Conventionally, there has been a known technology of intermittently performing positioning using positioning satellites such as a global positioning system (GPS) and estimating a position by autonomous navigation (dead reckoning) while GPS positioning is not performed (for example, see JP 2015-155802 A).

SUMMARY OF THE INVENTION

According to an aspect of the present invention, there is provided an electronic device comprising: a receiving unit that receives a radio wave from at least one of a plurality of positioning satellites; a processor; and a storage unit that stores a program to be executed by the processor, wherein by the program stored in the storage unit, the process executes a geographical condition acquisition process of acquiring geographical condition information of a current location at which the electronic device is present, and a satellite identification process of identifying one or more positioning satellites that the receiving unit can capture at the current location among the plurality of positioning satellites based on the geographical condition information of the current location or a receiving unit control process of controlling turning ON/OFF of the receiving unit based on the geographical condition information of the current location.

DETAILED DESCRIPTION OF THE PREFERRED EMBODIMENTS

Hereinafter, embodiments of the invention will be described with reference to drawings.

First Embodiment

[Configuration]

Figure 1A:
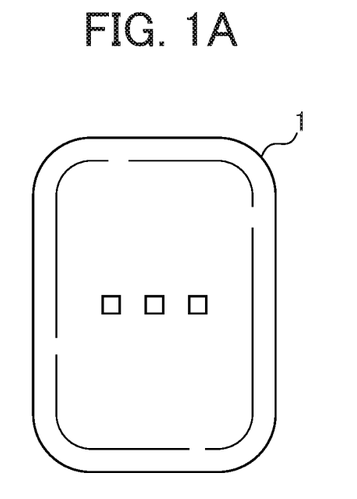
FIG. 1A is a schematic view of an electronic device according to an embodiment of the invention.

FIG. 1A is a schematic view of an electronic device 1 according to an embodiment of the invention.

Figure 1B:
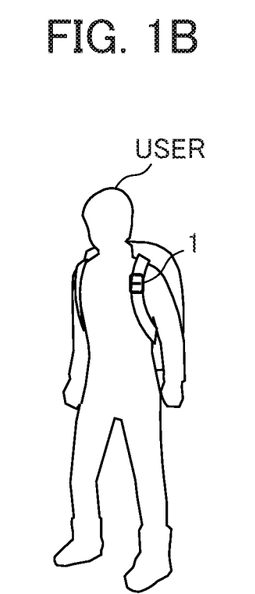
FIG. 1B is a schematic view illustrating an example of a usage mode of the electronic device.

In addition, FIG. 1B is a schematic view illustrating an example of a usage mode of the electronic device 1.

The electronic device 1 of the present embodiment executes positioning based on signals from positioning satellites by executing a positioning control process described below.

In addition, the electronic device 1 functions as a sensor unit including various sensors, and senses movement of a measurement target to acquire sensor information by being attached to the measurement target.

Further, the electronic device 1 executes positioning by autonomous navigation using the acquired sensor information (for example, acceleration and geomagnetism).

In the present embodiment, it is presumed that a motion of a user is sensed by attaching the electronic device 1 to the user performing an activity such as trekking.

As an example, the electronic device 1 can be mounted on a shoulder strap of a backpack carried by the user.

Figure 2:
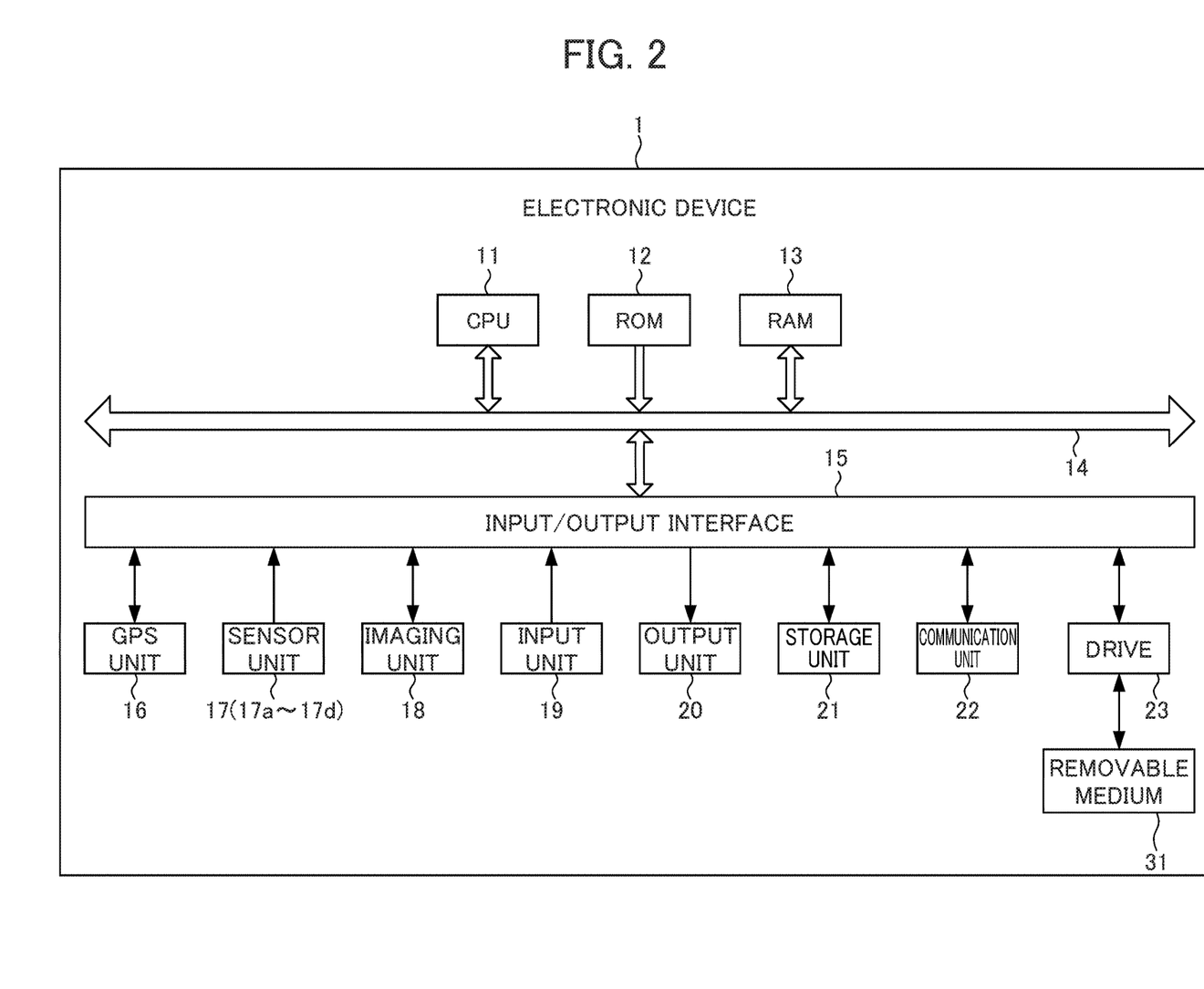
FIG. 2 is a block diagram illustrating a hardware configuration of the electronic device.

FIG. 2 is a block diagram illustrating a hardware configuration of the electronic device 1.

As illustrated in FIG. 2, the electronic device 1 includes a central processing unit (CPU) 11, a read only memory (ROM) 12, a random access memory (RAM) 13, a bus 14, an input/output interface 15, a GPS unit 16, a sensor unit 17, an imaging unit 18, an input unit 19, an output unit 20, a storage unit 21, a communication unit 22, and a drive 23.

The CPU 11 executes various processings according to a program recorded in the ROM 12, or a program loaded in the RAM 13 from the storage unit 21.

Data or the like necessary for the CPU 11 to execute various processings, is also suitably stored in the RAM 13.

The CPU 11, the ROM 12, and the RAM 13 are connected to each other through the bus 14. In addition, the input/output interface 15 is also connected to the bus 14. The GPS unit 16, the sensor unit 17, the imaging unit 18, the input unit 19, the output unit 20, the storage unit 21, the communication unit 22, and the drive 23 are connected to the input/output interface 15.

The GPS unit 16 receives GPS signals from a plurality of GPS satellites through a GPS receiving antenna (not illustrated).

The CPU 11 acquires position information such as information about latitude, longitude, and altitude indicating a current position of the device based on the GPS signals received by the GPS unit 16.

The sensor unit 17 includes a geomagnetism sensor 17a, a gyro sensor (angular speed sensor) 17b, an acceleration sensor 17c, and an atmospheric pressure sensor 17d, and outputs data of detection results by these sensors to the CPU 11.

In addition to these sensors, the sensor unit 17 may appropriately include various sensors (an air temperature sensor, etc.) necessary for processes executed by the electronic device 1.

Although not illustrated, the imaging unit 18 includes an optical lens unit and an image sensor.

The optical lens unit includes a lens such as, for example, a focus lens, a zoom lens, or the like that collects light in order to photograph a subject.

The focus lens is a lens that forms a subject image on a light receiving surface of the image sensor. The zoom lens is a lens that causes a focal length to be freely changed within a certain range.

Further, a peripheral circuit for adjusting setting parameters such as focus, exposure, white balance, and the like is installed in the imaging unit 18 if necessary.

The image sensor is configured of a photoelectric conversion element, an analog front end (AFE), or the like.

The photoelectric conversion element, for example, is configured of a complementary metal oxide semiconductor (CMOS) type photoelectric conversion element or the like. The subject image is incident on the photoelectric conversion element from the optical lens unit. Then, the photoelectric conversion element performs photoelectric conversion (imaging) with respect to the subject image, accumulates an image signal for a constant time, and sequentially supplies the accumulated image signals to the AFE, as an analog signal.

The AFE executes various signal processings such as analog/digital (A/D) conversion processing, with respect to the analog image signal. A digital signal is generated by the various signal processings, and is output as an output signal from the imaging section 18.

Such output signal from the imaging section 18 will be referred to as "imaged picture data". Imaged picture data is suitably supplied to the CPU 11 and the like.

The input unit 19 is configured of various buttons, a touch panel, or the like, and inputs various information items according to an instruction and an operation of the user.

The output unit 20 is configured of a display, a speaker, or the like, and outputs an image or a sound.

In the present embodiment, the input unit 19 capable of performing an input operation such as touching or swiping is disposed in an overlapping manner on the output unit 20 serving as a display for displaying an image, an icon, etc., and is included in a touch panel that serves as an interface.

The storage unit 21 includes a semiconductor memory such as a flash memory and stores data of various images.

The communication unit 22 controls communication with other devices (smartphone, for example) via wireless communication conforming to the standard such as Bluetooth (trademark) Low Energy (BLE) or Wireless Fidelity (Wi-Fi) or wired communication by using cables conforming to the standard such as Universal Serial Bus (USB). In addition, the communication unit 22 may have a function of performing communication by using a plurality of communication methods.

A removable medium 31 made of a magnetic disk, an optical disc, a magneto-optical disc, a semiconductor memory, etc. is appropriately mounted on the drive 23.

A program read from the removable medium 31 by the drive 23 is installed in the storage unit 21 as necessary.

In addition, the removable medium 31 can store various data such as data of an image stored in the storage unit 21 similarly to the storage unit 21.

Figure 3:
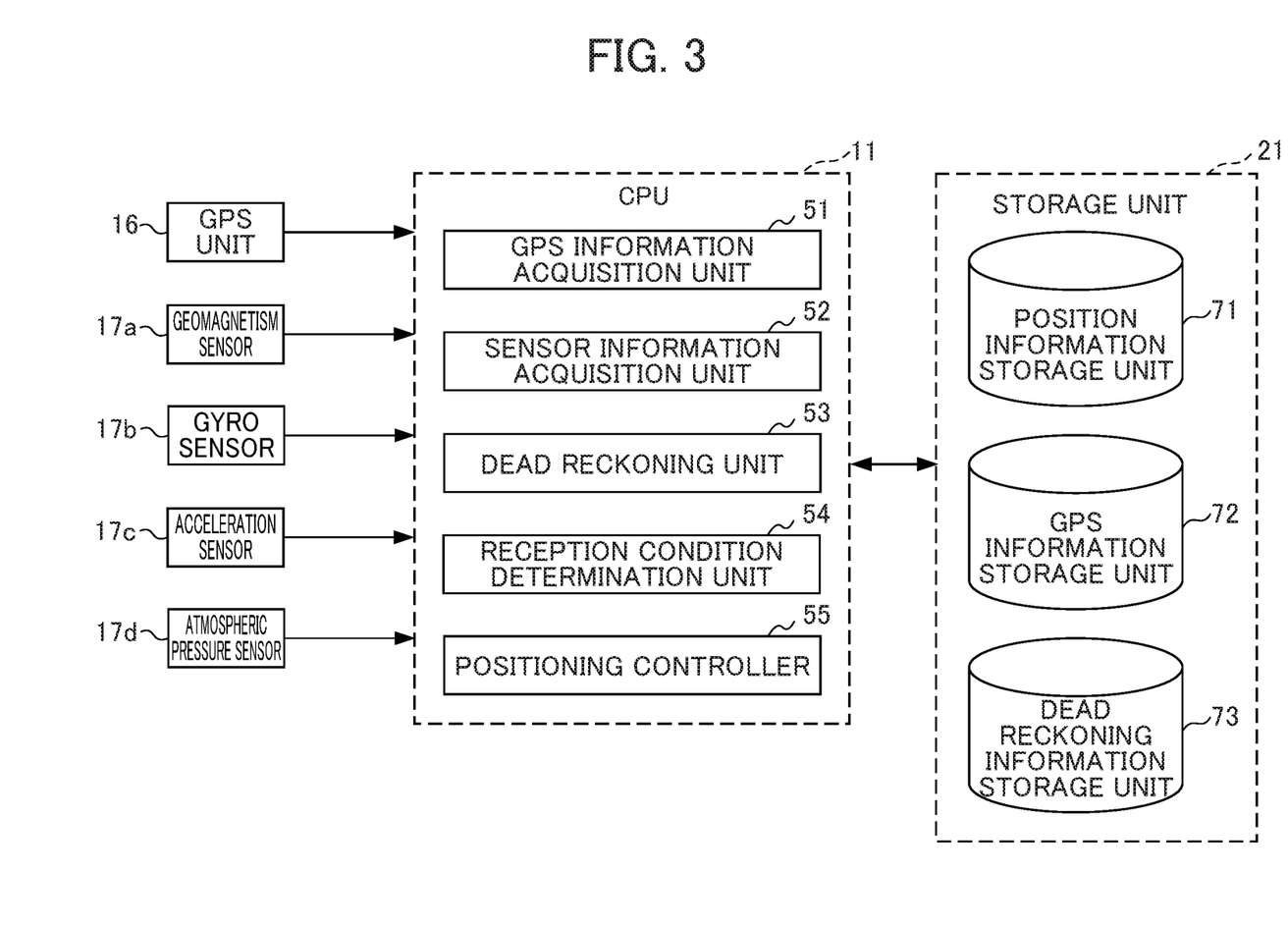
FIG. 3 is a functional block diagram illustrating a functional configuration for executing a positioning control process in a functional configuration of the electronic device of FIGS. 1A and 1B.

FIG. 3 is a functional block diagram illustrating a functional configuration for executing a calibration control process in a functional configuration of the electronic device 1 of FIG. 1A.

The positioning control process refers to a series of processes of controlling turning ON/OFF of reception of GPS signals based on a reception condition at the time of not receiving a GPS signal when positioning is performed in conjunction with intermittent reception of GPS signals and estimation of a current position using pedestrian dead reckoning in the electronic device 1.

When the positioning control process is executed, as illustrated in FIG. 3, in the CPU 11, a GPS information acquisition unit 51, a sensor information acquisition unit 52, a dead reckoning unit 53, a reception condition determination unit 54, and a positioning controller 55 function.

In addition, in one area of the storage unit 21, a position information storage unit 71, a GPS information storage unit 72, and a dead reckoning information storage unit 73 are set.

Position information acquired by receiving a GPS signal and position information acquired by pedestrian dead reckoning are stored in the position information storage unit 71 together with time information.

GPS related information for GPS positioning is stored in the GPS information storage unit 72.

For example, the GPS information storage unit 72 stores ephemeris information used in GPS positioning, information related to signal quality and positioning accuracy of a received GPS signal, arrangement information of GPS satellites, etc.

The dead reckoning information storage unit 73 stores dead reckoning related information related to estimation of a position by pedestrian dead reckoning.

For example, the dead reckoning information storage unit 73 stores information indicating an occurrence degree of an estimated error of a position in pedestrian dead reckoning.

In the present embodiment, an occurrence amount (distance) of the estimated error of the position per unit time is stored as the information indicating the occurrence degree of the estimated error of the position in pedestrian dead reckoning.

In this case, an estimation error may be set to zero when the user is not moving.

An occurrence amount (distance) of the estimated error of the position per unit moving distance may be stored as the information indicating the occurrence degree of the estimated error of the position in pedestrian dead reckoning.

The information indicating the occurrence degree of the estimated error of the position in pedestrian dead reckoning may be acquired by actual measurement or simulation.

When a GPS signal is received by the GPS unit 16, the GPS information acquisition unit 51 acquires position information (latitude, longitude, and height) based on the GPS signal.

The sensor information acquisition unit 52 acquires detection results of various sensors acquired by the sensor unit 17.

When a GPS signal is not received by the GPS unit 16, the dead reckoning unit 53 calculates a moving direction and a moving distance of the user by pedestrian dead reckoning based on the detection results of the various sensors acquired by the sensor information acquisition unit 52.

In the present embodiment, the dead reckoning unit 53 acquires a traveling direction by the geomagnetism sensor 17a and/or the gyro sensor 17b, and acquires the number of steps, etc. by the acceleration sensor 17c, thereby acquiring a moving trajectory of the user.

In addition, the dead reckoning unit 53 acquires an altitude difference by the atmospheric pressure sensor 17d.

Then, the dead reckoning unit 53 acquires position information by adding the moving distance to the moving direction calculated by pedestrian dead reckoning with respect to the position information acquired based on the GPS signal.

The reception condition determination unit 54 determines whether or not currently accumulated valid ephemeris information satisfies a predetermined condition (is greater than or equal to a lower limit value of the ephemeris information or not).

When the currently accumulated valid ephemeris information satisfies the predetermined condition, the reception condition determination unit 54 identifies a GPS satellite that can be captured at a current location based on a current traveling direction, an obliquity of the current position (geographical condition), and arrangement information of GPS satellites stored in the GPS information storage unit 72.

For example, the current traveling direction may be acquired from a detection result of the geomagnetism sensor 17a. For example, the obliquity of the current position may be acquired from a detection result of the acceleration sensor 17c.

In addition, the reception condition determination unit 54 calculates a predicted positioning time of the GPS based on the currently accumulated valid ephemeris information (more specifically, ephemeris information acquired from a GPS satellite identified as a GPS satellite that can be captured at the current location).

Furthermore, the reception condition determination unit 54 calculates an estimated error of pedestrian dead reckoning corresponding to the calculated predicted positioning time and an estimated error of a position occurring in pedestrian dead reckoning up to the present.

Then, the reception condition determination unit 54 determines whether or not a value of the predicted error of pedestrian dead reckoning (a sum of the estimated error of pedestrian dead reckoning corresponding to the predicted positioning time and the estimated error of the position occurring in pedestrian dead reckoning up to the present) is greater than or equal to a value of an allowable error.

When the value of the predicted error of pedestrian dead reckoning is greater than or equal to the value of the allowable error, reception of GPS signals is turned ON by the positioning controller 55.

When the reception condition determination unit 54 determines that valid ephemeris information is not accumulated by a predetermined information amount or more, and when it is determined that a value of a predicted error of pedestrian dead reckoning is greater than or equal to a value of an allowable error, the positioning controller 55 turns ON reception of GPS signals.

The positioning controller 55 turns ON reception of GPS signals immediately after the positioning control process is started or when an instruction by the user is made.

In addition, the positioning controller 55 determines whether or not the GPS is fixed, and the ephemeris information is accumulated by the predetermined information amount or more.

When the GPS is fixed, and the ephemeris information is accumulated by the predetermined information amount or more, the positioning controller 55 stores the accumulated ephemeris information in the GPS information storage unit 72.

In addition, when the GPS is fixed, and the ephemeris information is accumulated by the predetermined information amount or more, the positioning controller 55 calculates satellite arrangement and turns OFF reception of GPS signals.

By realizing such a function, in the electronic device 1, in a state in which reception of GPS signals is turned OFF, a reception condition of the GPS signal is determined, and it is successively determined whether or not the value of the estimated error accumulated by pedestrian dead reckoning is greater than or equal to the value of the allowable error from when reception of GPS signals is turned ON until position information is acquired by the GPS.

Figure 4:
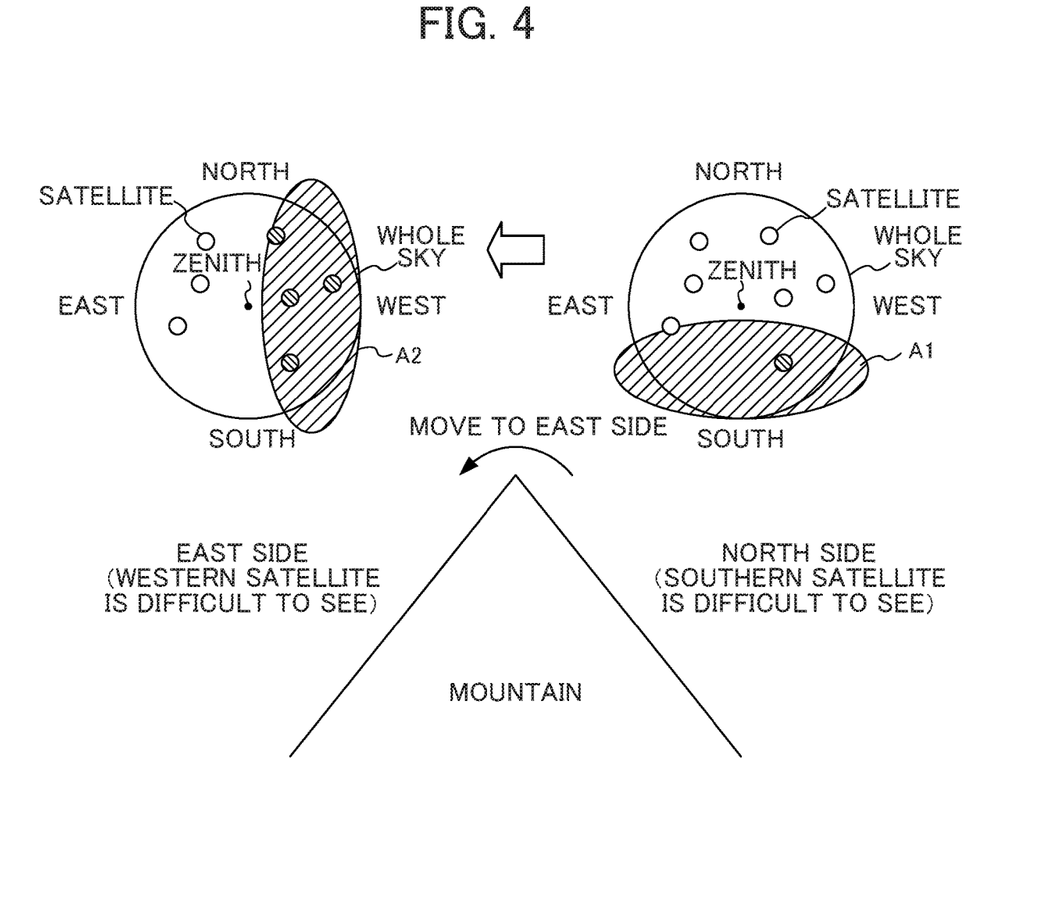
FIG. 4 is a schematic view illustrating a state in which the number of receivable GPS satellites changes.

FIG. 4 is a schematic view illustrating a state in which the number of receivable GPS satellites changes.

As illustrated in FIG. 4, when the user is located on a northern slope of a mountain, a satellite in a south direction (a satellite in a shaded portion A1 of FIG. 4) is in an unreceivable state.

In addition, when the user is located on an eastern slope of the mountain, a satellite in a west direction (a satellite in a shaded portion A2 of FIG. 4) is in an unreceivable state.

In this way, the number of satellites that can be captured varies depending on the difference of the slope where the user is located.

In addition, even when a GPS signal can be received from a satellite in a direction opposite to the slope where the user is located, a Carrier to Noise ratio value of the received signal is lowered.

Figure 5A:
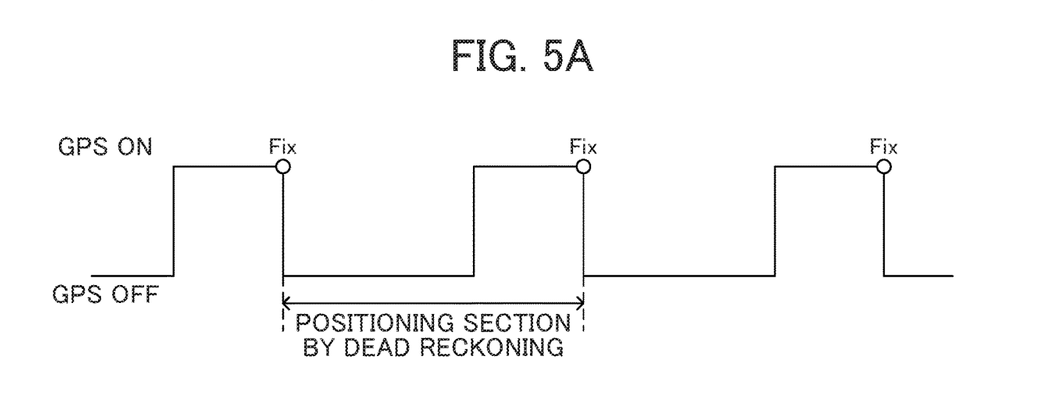
FIG. 5A is a schematic diagram illustrating an example of a control mode in the case of intermittently receiving a GPS signal and is a diagram illustrating a basic control mode in the case of intermittently receiving the GPS signal.
Figure 5B:
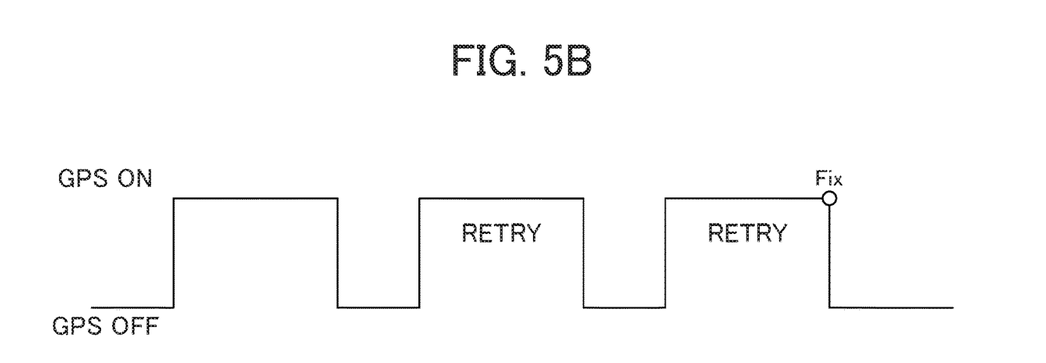
FIG. 5B is a schematic diagram illustrating an example of a control mode in the case of intermittently receiving the GPS signal and is a diagram illustrating an example of the case of being controlled by the basic control mode when a reception environment of the GPS signal is defective.
Figure 5C:
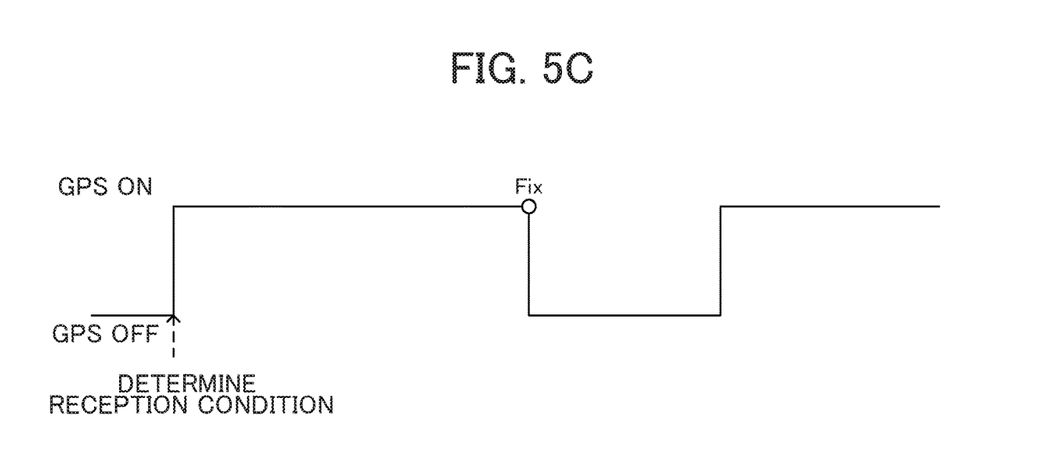
FIG. 5C is a schematic diagram illustrating an example of a control mode in the case of intermittently receiving the GPS signal and is a diagram illustrating an example of the case of being controlled by a control mode of the invention.

FIG. 5A to FIG. 5C are schematic diagrams illustrating examples of a control mode when GPS signals are intermittently received. FIG. 5A is a diagram illustrating an example of a basic control mode when GPS signals are intermittently received, FIG. 5B is a diagram illustrating an example of the case of being controlled by the basic control mode of FIG. 5A when a reception environment of the GPS signals is defective, and FIG. 5C is a diagram illustrating an example of the case of being controlled by a control mode of the invention.

As illustrated in FIG. 5A, in the basic control mode, reception of GPS signals is turned ON at a preset timing, and reception of GPS signals is turned OFF after the GPS is fixed.

In this instance, a predetermined time is required until the GPS is fixed.

Then, after reception of GPS signals is turned OFF, pedestrian dead reckoning is performed.

Thereafter, before an allowable error due to pedestrian dead reckoning is exceeded, reception of GPS signals is turned ON again.

Here, as illustrated in FIG. 5B, in a case in which the reception environment of GPS signals is defective, there occurs a situation in which the GPS is not fixed for a time set in advance as a timeout or more after reception of GPS signals is turned ON. In this case, reception of GPS signals is turned OFF, and retrying is performed.

When such a process is repeated, a time required until the GPS is fixed may be prolonged and the allowable error due to pedestrian dead reckoning may be exceeded.

For this reason, a required positioning performance is not satisfied.

On the other hand, as illustrated in FIG. 5C, in the control mode of the invention, a reception condition of a GPS signal is determined in a state in which reception of GPS signals is turned OFF, and reception of GPS signals is turned ON when it is determined that a value of a predicted error of pedestrian dead reckoning is greater than or equal to a value of the allowable error.

In this way, it is possible to advance the timing until the GPS is fixed to suppress the situation in which the allowable error due to pedestrian dead reckoning is exceeded.

That is, it is possible to more appropriately control positioning performed by intermittently receiving signals from the positioning satellite.

[Operation]

Next, a description will be given of an operation of the electronic device 1.

Figure 6:
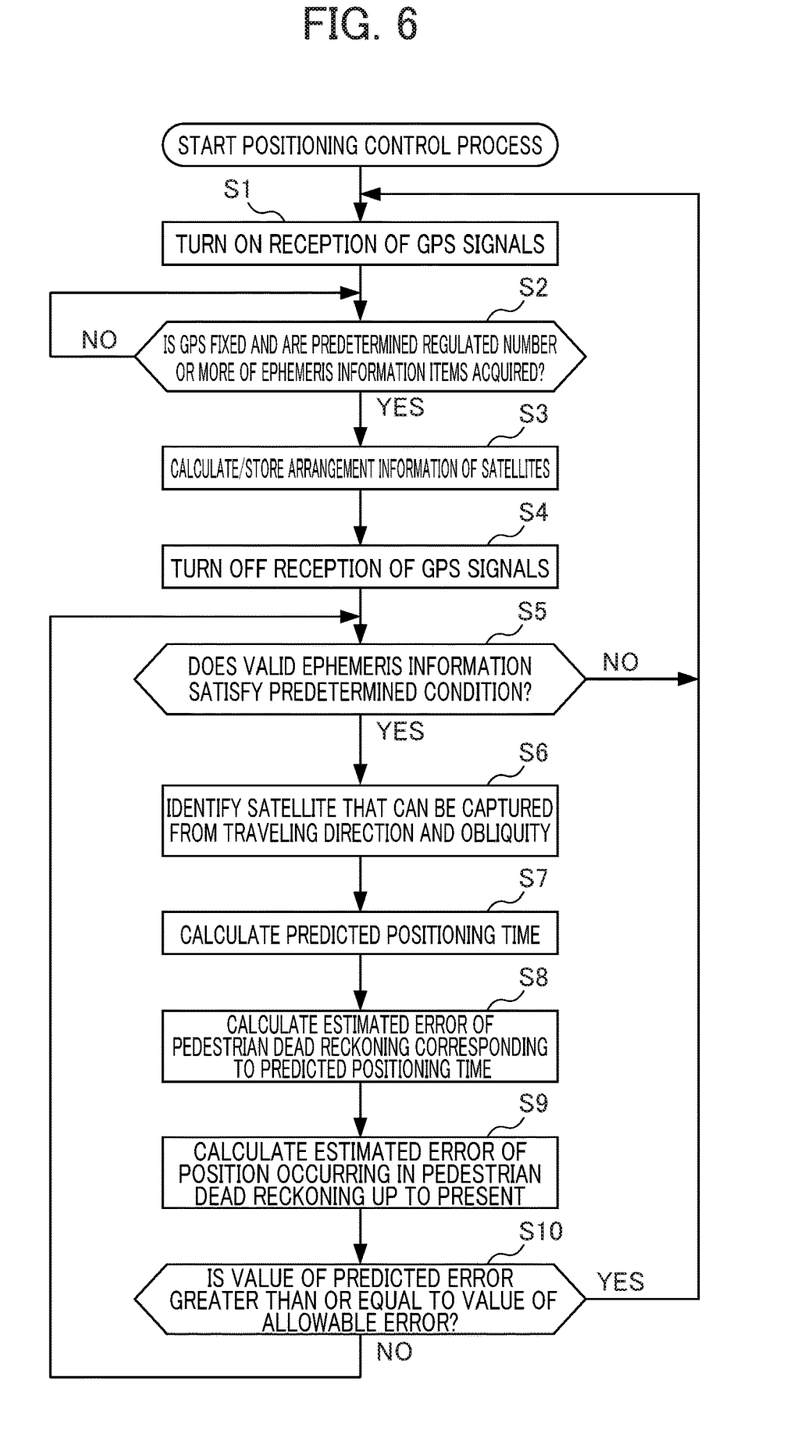
FIG. 6 is a flowchart for description of a flow of a positioning control process executed by the electronic device.

FIG. 6 is a flowchart for description of a flow of the positioning control process executed by the electronic device 1.

The positioning control process is started by performing an operation of giving a command for start of the positioning control process through the input unit 19.

In step S1, the positioning controller 55 turns ON reception of GPS signals.

In step S2, the positioning controller 55 determines whether or not the GPS is fixed and a predetermined regulated number or more of ephemeris information items are acquired.

When the GPS is fixed, and the predetermined regulated number or more of ephemeris information items are not acquired, NO is determined in step S2, and the process of step S2 is repeated.

On the other hand, when the GPS is fixed, and the predetermined regulated number or more of ephemeris information items are acquired, YES is determined in step S2, the acquired ephemeris information and information related to signal quality and positioning accuracy of the received GPS signal are stored in the GPS information storage unit 72, and the process proceeds to step S3.

In step S3, the positioning controller 55 calculates arrangement information of GPS satellites, and stores the calculated arrangement information of the GPS satellites in the GPS information storage unit 72.

In step S4, the positioning controller 55 turns OFF reception of GPS signals.

In step S5, the reception condition determination unit 54 determines whether or not the currently accumulated valid ephemeris information satisfies the predetermined condition (is greater than or equal to the lower limit value of the ephemeris information or not).

When the currently accumulated valid ephemeris information does not satisfy the predetermined condition, NO is determined in step S5, and the process proceeds to step S1.

On the other hand, when the currently accumulated valid ephemeris information satisfies the predetermined condition, YES is determined in step S5, and the process proceeds to step S6.

In step S6, the reception condition determination unit 54 identifies a GPS satellite that can be captured at a current location based on a current traveling direction, an obliquity of the current position, and arrangement information of GPS satellites stored in the GPS information storage unit 72.

In step S7, the reception condition determination unit 54 calculates the predicted positioning time of the GPS based on the ephemeris information acquired from the GPS satellite identified as a GPS satellite that can be captured at the current location in the currently accumulated valid ephemeris information.

In step S8, the reception condition determination unit 54 calculates an estimated error of pedestrian dead reckoning corresponding to the calculated predicted positioning time.

In step S9, the reception condition determination unit 54 calculates an estimated error of a position occurring in pedestrian dead reckoning up to the present.

In step S10, the reception condition determination unit 54 determines whether or not a value of the predicted error of pedestrian dead reckoning (a sum of the estimated error of pedestrian dead reckoning corresponding to the predicted positioning time and the estimated error of the position occurring in pedestrian dead reckoning up to the present) is greater than or equal to a value of the allowable error.

When the value of the predicted error of pedestrian dead reckoning is not greater than or equal to the value of the allowable error, NO is determined in step S10, and the process proceeds to step S5.

On the other hand, when the value of the predicted error of pedestrian dead reckoning is greater than or equal to the value of the allowable error, YES is determined in step S10, and the process proceeds to step S1.

Such a process is repeated until an operation of giving a command for end of the positioning control process is performed.

As described above, the electronic device 1 according to the present embodiment determines the reception condition of the GPS signal in a state in which reception of GPS signals is turned OFF, and successively determines whether or not the value of the estimated error accumulated by pedestrian dead reckoning is greater than or equal to the value of the allowable error from when reception of GPS signals is turned ON until position information is acquired by the GPS.

Then, when it is determined that the value of the predicted error of pedestrian dead reckoning is greater than or equal to the value of the allowable error, the electronic device turns ON reception of GPS signals.

In this way, it is possible to advance the timing until the GPS is fixed and to suppress the situation in which the allowable error due to pedestrian dead reckoning is exceeded.

That is, it is possible to more appropriately control positioning performed by intermittently receiving signals from the positioning satellite.

Second Embodiment

Next, a description will be given of a second embodiment of the invention.

A hardware configuration of an electronic device 1 according to the second embodiment is the same as a hardware configuration of the first embodiment illustrated in FIG. 2.

In addition, a functional configuration of the electronic device 1 according to the second embodiment is the same as a functional configuration of the first embodiment illustrated in FIG. 3 except for a configuration of a reception condition determination unit 54.

Hereinafter, a description will be mainly given of a functional configuration of the reception condition determination unit 54 and a flow of a positioning control process which are different from those of the first embodiment.

When reception of GPS signals is turned ON, the reception condition determination unit 54 stores a range corresponding to a blind area (a range that may not be seen in a whole sky) in capturing of GPS satellites from a current traveling direction and an obliquity of a current position.

In addition, the reception condition determination unit 54 determines whether or not currently accumulated valid ephemeris information satisfies a predetermined condition (is greater than or equal to a lower limit value of ephemeris information or not).

When the currently accumulated valid ephemeris information satisfies the predetermined condition, the reception condition determination unit 54 calculates the range corresponding to the blind area (the range that may not be seen in the whole sky) in capturing of GPS satellites from the current traveling direction and the obliquity of the current position.

Then, the reception condition determination unit 54 determines whether or not a deviation between the stored range corresponding to the blind area and the newly calculated range corresponding to the blind area is greater than or equal to a preset size.

When the deviation between the stored range corresponding to the blind area and the newly calculated range corresponding to the blind area is greater than or equal to the preset size, the number of satellites that can be captured greatly changes, and it is considered that ephemeris information accumulated during reception of GPS signals may not be used. Thus, reception of GPS signals is turned ON by the positioning controller 55.

Figure 7:
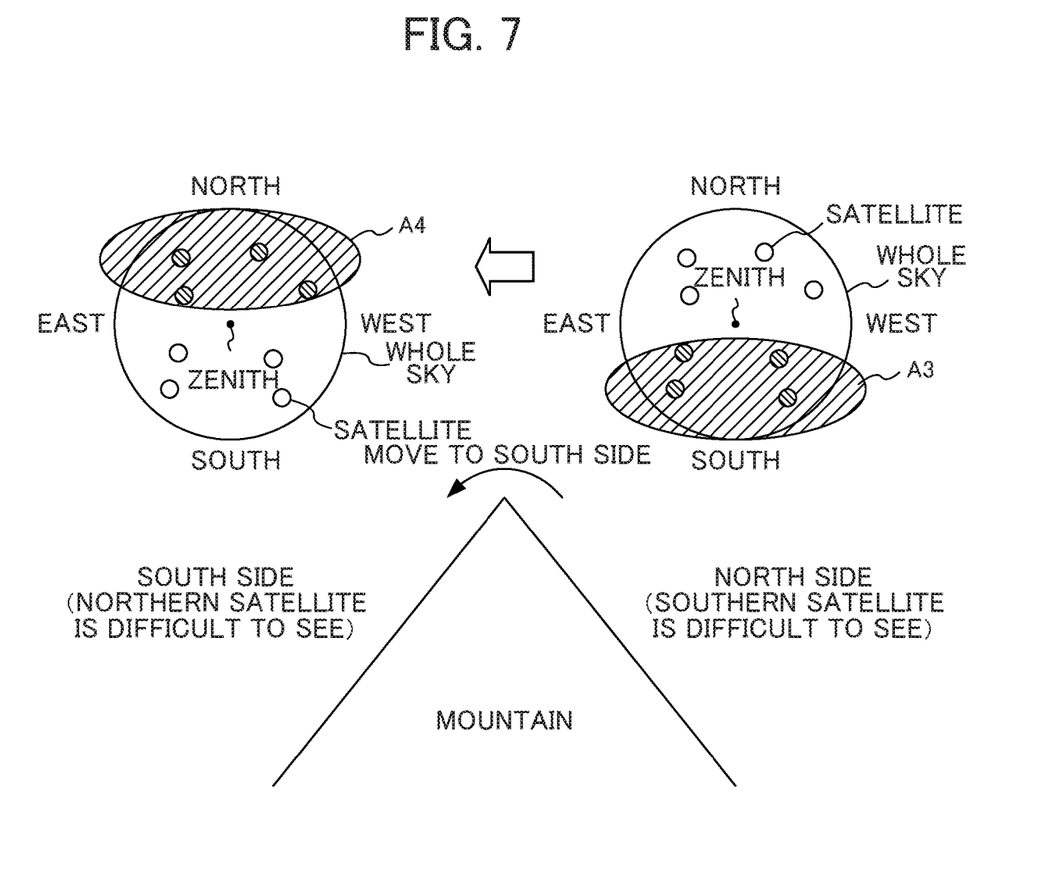
FIG. 7 is a schematic view illustrating a state in which the number of receivable GPS satellites changes.

FIG. 7 is a schematic view illustrating a state in which the number of receivable GPS satellites changes.

As illustrated in FIG. 7, when the user is located on a northern slope of a mountain, a predetermined range in the south direction (a shaded portion A3 of FIG. 7) corresponds to a blind area in capturing of GPS satellites.

In addition, when the user is located on a southern slope of the mountain, a predetermined range in the north direction (a shaded portion A4 of FIG. 7) corresponds to a blind area in capturing of GPS satellites.

In this way, a range that may not be seen in the whole sky varies depending on the difference of the slope where the user is located, and thus the number of satellites that can be captured is different.

On the other hand, by realizing the above-described function, in the electronic device 1, a range corresponding to a blind area in capturing of GPS satellites in a case in which reception of GPS signals is turned ON is compared with a range corresponding to a blind area in capturing of GPS satellites in a case in which reception of GPS signals is turned OFF, and reception of GPS signals is turned ON when these ranges are greatly different from each other.

In this way, it is possible to suppress a situation in which ephemeris information accumulated when reception of GPS signals was turned ON may not be used in a case in which reception of GPS signals is turned OFF, and a time required until the GPS is fixed becomes excessively long.

That is, it is possible to advance a timing until the GPS is fixed.

Therefore, it is possible to more appropriately control positioning performed by intermittently receiving signals from the positioning satellite.

[Operation]

Next, a description will be given of an operation of the electronic device 1.

Figure 8:
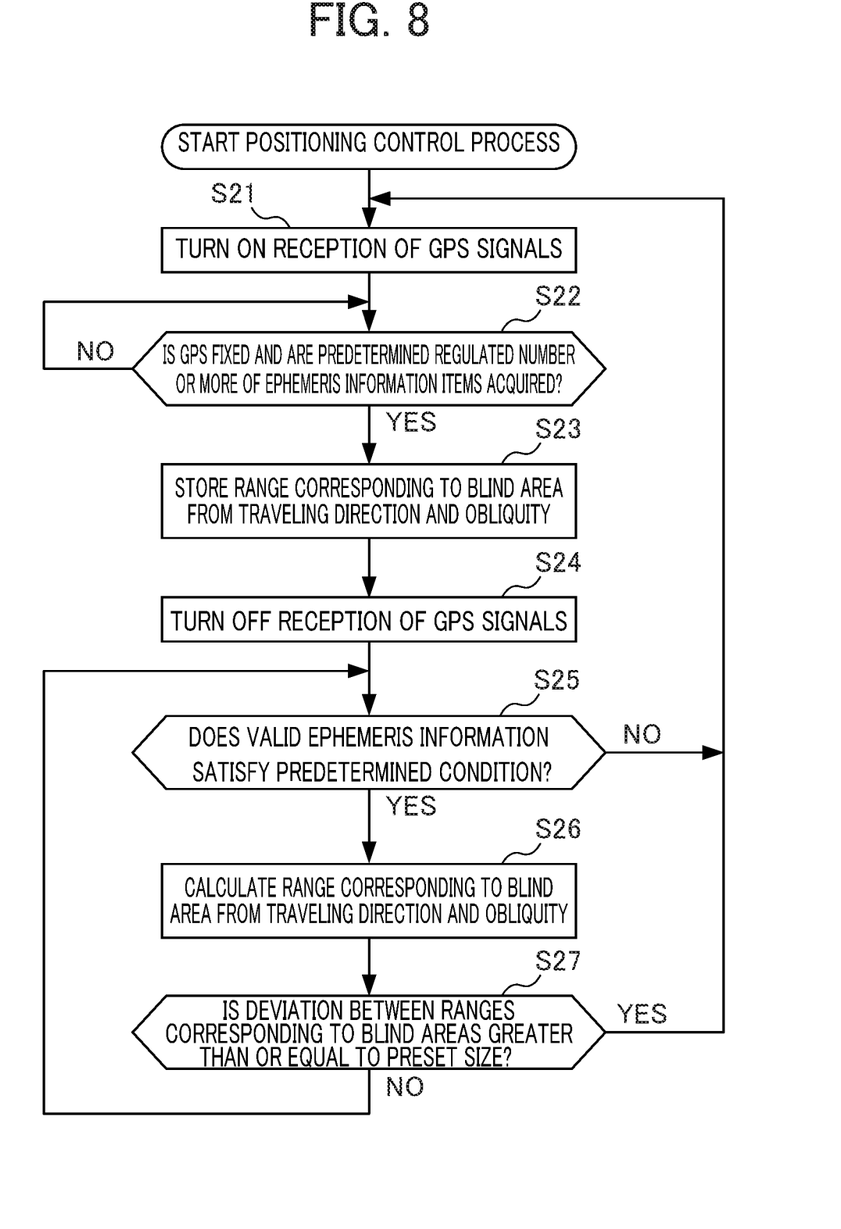
FIG. 8 is a flowchart for description of a flow of a positioning control process executed by the electronic device.

FIG. 8 is a flowchart for description of a flow of the positioning control process executed by the electronic device 1.

The positioning control process is started by performing an operation of giving a command for start of the positioning control process through the input unit 19.

In step S21, the positioning controller 55 turns ON reception of GPS signals.

In step S22, the positioning controller 55 determines whether or not the GPS is fixed and a predetermined regulated number or more of ephemeris information items are acquired.

When the GPS is fixed, and the predetermined regulated number or more of ephemeris information items are not acquired, NO is determined in step S22, and the process of step S22 is repeated.

On the other hand, when the GPS is fixed, and the predetermined regulated number or more of ephemeris information items are acquired, YES is determined in step S22, the acquired ephemeris information and information related to signal quality and positioning accuracy of the received GPS signal are stored in the GPS information storage unit 72, and the process proceeds to step S23.

In step S23, the reception condition determination unit 54 stores a range corresponding to a blind area (a range that may not be seen in the whole sky) in capturing of GPS satellites from a current traveling direction and an obliquity of a current position.

In step S24, the positioning controller 55 turns OFF reception of GPS signals.

In step S25, the reception condition determination unit 54 determines whether or not the currently accumulated valid ephemeris information satisfies the predetermined condition (is greater than or equal to the lower limit value of the ephemeris information or not).

When the currently accumulated valid ephemeris information does not satisfy the predetermined condition, NO is determined in step S25, and the process proceeds to step S21.

On the other hand, when the currently accumulated valid ephemeris information satisfies the predetermined condition, YES is determined in step S25, and the process proceeds to step S26.

In step S26, the range corresponding to the blind area (the range that may not be seen in the whole sky) in capturing of GPS satellites is calculated from the current traveling direction and the obliquity of the current position.

In step S27, the reception condition determination unit 54 determines whether or not a deviation between the range corresponding to the blind area stored in step S23 and the range corresponding to the blind area newly calculated in step S26 is greater than or equal to a preset size.

When the deviation between the range corresponding to the blind area stored in step S23 and the range corresponding to the blind area newly calculated in step S26 is not greater than or equal to the preset size, NO is determined in step S27, and the process proceeds to step S25.

On the other hand, when the deviation between the range corresponding to the blind area stored in step S23 and the range corresponding to the blind area newly calculated in step S26 is greater than or equal to the preset size, YES is determined in step S27, and the process proceeds to step S21.

Such a process is repeated until an operation of giving a command for end of the positioning control process is performed.

As described above, the electronic device 1 according to the present embodiment compares a range corresponding to a blind area in capturing of GPS satellites in a case in which reception of GPS signals is turned ON with a range corresponding to a blind area in capturing of GPS satellites in a case in which reception of GPS signals is turned OFF, and turns ON reception of GPS signals when these ranges are greatly different from each other.

In this way, it is possible to suppress a situation in which ephemeris information accumulated when reception of GPS signals was turned ON may not be used in a case in which reception of GPS signals is turned OFF, and a time required until the GPS is fixed becomes excessively long.

That is, it is possible to advance a timing until the GPS is fixed.

Therefore, it is possible to more appropriately control positioning performed by intermittently receiving signals from the positioning satellite.

The electronic device 1 configured as described above includes the GPS unit 16, the GPS information acquisition unit 51, the sensor information acquisition unit 52, and the reception condition determination unit 54.

The GPS unit 16 receives radio waves from positioning satellites.

The GPS information acquisition unit 51 acquires ephemeris information by the GPS unit 16, and acquires satellite arrangement information of each of a plurality of positioning satellites acquiring the ephemeris information.

The sensor information acquisition unit 52 acquires geographical condition information of a current location at which the electronic device 1 is present.

The reception condition determination unit 54 identifies the number of positioning satellites that can be captured at the current location among the plurality of positioning satellites acquiring the ephemeris information based on the geographical condition information of the current location and the satellite arrangement information.

In this way, even when a GPS signal is not being received, a reception condition of the GPS signal may be determined, and thus it is possible to determine an appropriate timing to receive the GPS signal.

Therefore, it is possible to perform satellite positioning that can ensure a required positioning performance.

The sensor information acquisition unit 52 acquires a traveling direction and an obliquity in movement of the electronic device 1.

The reception condition determination unit 54 identifies positioning satellites that can be captured at the current location among a plurality of positioning satellites acquiring ephemeris information based on the obliquity of the traveling direction and the satellite arrangement information.

In this way, it is possible to identify a satellite that can receive a GPS signal by reflecting an influence of a terrain, etc. at a position at which the electronic device 1 is present.

The reception condition determination unit 54 acquires a predicted positioning time by the GPS unit 16 based on ephemeris information acquired from positioning satellites identified as positioning satellites that can be captured at the current location.

In this way, it is possible to estimate a time required for positioning after reception of GPS signals is turned ON when reception of GPS signals is turned OFF.

The GPS information acquisition unit 51 acquires accuracy information of a satellite signal.

The reception condition determination unit 54 acquires a predicted positioning time by the GPS unit 16 based on the accuracy information and the ephemeris information acquired from the positioning satellites identified as positioning satellites that can be captured at the current location.

In this way, it is possible to estimate a time required for positioning after reception of GPS signals is turned ON in a case in which reception of GPS signals is turned OFF by reflecting the accuracy information of the satellite signal.

The electronic device 1 includes the positioning controller 55.

The positioning controller 55 intermittently drives the GPS unit 16.

In addition, the positioning controller 55 controls turning ON/OFF of the GPS unit 16 based on the predicted positioning time.

In this way, when the predicted positioning time is expected to be prolonged, it is possible to turn ON the GPS unit 16 and rapidly perform positioning using the GPS.

The positioning controller 55 calculates a predicted error accumulated while the GPS unit 16 is turned OFF based on the predicted positioning time, and turns ON the GPS unit 16 when the predicted error is greater than or equal to the preset allowable error.

In this way, when the GPS unit 16 is turned OFF, a positioning error may be more accurately predicted to perform GPS positioning.

The sensor information acquisition unit 52 acquires the traveling direction and the obliquity in movement of the electronic device 1.

The reception condition determination unit 54 acquires a range corresponding to a blind area in capturing of positioning satellites based on the obliquity of the traveling direction and the satellite arrangement information.

In this way, it is possible to perform GPS positioning based on a change of the range corresponding to the blind area in capturing of positioning satellites.

The GPS information acquisition unit 51 acquires position information of the current position based on radio waves from positioning satellites received by the GPS unit 16.

In this way, it is possible to acquire accurate position information ensuring a required positioning performance.

In addition, the electronic device 1 includes the GPS unit 16, the sensor information acquisition unit 52, and the positioning controller 55.

The positioning controller 55 intermittently drives the GPS unit 16.

The sensor information acquisition unit 52 acquires geographical condition information of a current location at which the electronic device 1 is present.

The positioning controller 55 controls turning ON/OFF of the GPS unit 16 based on the geographical condition information of the current location at which the electronic device 1 is present.

In this way, even when a GPS signal is not being received, a reception condition of the GPS signal may be determined, and thus it is possible to determine an appropriate timing to receive the GPS signal.

Therefore, it is possible to perform satellite positioning that can ensure a required positioning performance.

It should be noted that the present invention is not to be limited to the aforementioned embodiments, and that modifications, improvements, etc. within a scope that can achieve the objects of the present invention are also included in the present invention.

For example, in the above-described embodiments, a case in which positioning is performed using the GPS has been given as an example. However, the invention is not limited thereto.

That is, the invention can be applied to various positioning systems using satellites such as GLONASS of Russia, Galileo of Europe, BeiDou of China, etc.

In addition, it is possible to adopt various dead reckoning technologies for pedestrians or others as autonomous navigation executed in the above-described embodiments.

In the above-described embodiments, the current traveling direction and the obliquity of the current position are acquired as the geographical condition. However, the invention is not limited thereto.

That is, when a satellite capable of receiving a signal can be determined from the current position, map information or terrain information may be acquired as the geographical condition.

Examples of the map information include a city map, etc., and it is possible to acquire a height of a located building, etc.

In addition, examples of the terrain information include a topographic map, etc., and it is possible to acquire undulation of a terrain, etc.

In addition, in the first embodiment, the reception condition determination unit 54 calculates the predicted positioning time of the GPS based on the currently accumulated valid ephemeris information (more specifically, the number of GPS satellites that can be captured). However, the invention is not limited thereto.

For example, it is possible to calculate the predicted positioning time of the GPS based on information related to positioning accuracy of a GPS signal or information related to a signal quality of a GPS signal, and it is possible to calculate the predicted positioning time of the GPS based on one or a plurality of combinations of the currently accumulated valid ephemeris information (more specifically, ephemeris information acquired from a GPS satellite identified as a GPS satellite that can be captured at the current location), information related to positioning accuracy of a GPS signal, and information related to a signal quality.

In addition, it is possible to adopt an embodiment obtained by combining the first embodiment and the second embodiment described above.

In more detail, it is possible to implement functions of the reception condition determination unit 54 in the first embodiment and the second embodiment together, and perform a control operation to turn ON reception of a GPS signal according to results obtained by respectively determining the determination condition in the first embodiment and the determination condition in the second embodiment, respectively.

In addition, in the above-described embodiments, the sensor unit has been given as an example of the electronic device 1 to which the invention is applied. However, the invention is not particularly limited thereto.

For example, the invention is applicable to a general electronic device having a positioning function.

Specifically, for example, the invention can be applied to a laptop personal computer, a printer, a television receiver, a video camera, a portable navigation device, a mobile phone, a smartphone, a smart watch, a portable game machine, etc.

The processing sequence described above can be executed by hardware, and can also be executed by software.

In other words, the functional configuration of FIG. 3 is merely an illustrative example, and the present invention is not particularly limited thereto. More specifically, the types of functional blocks employed to realize the above-described functions are not particularly limited to the examples shown in FIG. 3, so long as the electronic device 1 can be provided with the functions enabling the aforementioned processing sequence to be executed in its entirety.

A single functional block may be configured by a single piece of hardware, a single installation of software, or a combination thereof.

The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or recording medium to a computer or the like.

The computer may be a computer equipped with dedicated hardware. In addition, the computer may be a computer capable of executing various functions, e.g., a general purpose personal computer, by installing various programs.

The storage medium containing such a program can not only be constituted by the removable medium 31 of FIG. 2 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 2 in which the program is recorded or a hard disk, etc. included in the storage unit 21 of FIG. 2.

It should be noted that, in the present specification, the steps defining the program recorded in the storage medium include not only the processing executed in a time series following this order, but also processing executed in parallel or individually, which is not necessarily executed in a time series.

Further, in the present specification, the terminology of the system means an entire apparatus including a plurality of apparatuses and a plurality of units.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. A positioning control device comprising:
   a receiving unit that receives a radio wave from a positioning satellite;
   a processor; and
   a storage unit that stores satellite arrangement information of a plurality of positioning satellites,
   wherein the processor is configured to execute a stored program to perform:

a geographical condition acquisition process of acquiring geographical condition information of a current location at which the positioning control device is present, a satellite identification process of identifying a positioning satellite allowed to be captured at the current location based on the geographical condition information of the current location and the satellite arrangement information of each of the plurality of positioning satellites stored in the storage unit, a positioning time acquisition process of acquiring, when the receiving unit is turned OFF, a predicted positioning time which is a time required for positioning with a radio wave from the positioning satellite identified by the satellite identification process, from a time that the receiving unit is turned ON, and a receiving unit control process of turning ON the receiving unit at a timing based on the predicted positioning time acquired in the positioning time acquisition process.

2. The positioning control device according to claim 1, wherein the geographical condition acquisition process acquires a traveling direction and an obliquity in movement of the positioning control device.

3. The positioning control device according to claim 1, wherein the processor is configured to execute a stored program to further perform:

an accuracy information acquisition process of acquiring accuracy information of a satellite signal, wherein the positioning time acquisition process acquires the predicted positioning time based on the accuracy information.

4. The positioning control device according to claim 1, wherein the receiving unit control process calculates a predicted error which is accumulated while the receiving unit is turned OFF based on the predicted positioning time, and turns ON the receiving unit when the predicted error is greater than or equal to a preset allowable error.

5. The positioning control device according to claim 1, wherein the geographical condition acquisition process acquires a traveling direction and an obliquity of the positioning control device, and wherein the satellite identification process acquires a range corresponding to a blind area in capturing of the positioning satellite based on an obliquity of the traveling direction and satellite arrangement information.

6. The positioning control device according to claim 1, wherein the receiving unit control process controls turning ON/OFF of the receiving unit based on the positioning satellite identified by the satellite identification process.

7. The positioning control device according to claim 1, wherein the receiving unit control process controls turning ON/OFF of the receiving unit based on at least one of: the positioning satellite identified by the satellite identification process, and a range corresponding to a blind area in capturing of the positioning satellite.

8. The positioning control device according to claim 1, wherein the processor is configured to execute a stored program to further perform:

a position information acquisition process of acquiring position information of a current position based on the radio wave from the positioning satellite received by the receiving unit.

9. A positioning control method executed by a positioning control device including a receiving unit that receives a radio wave from a positioning satellite, the positioning control method comprising:

a geographical condition acquisition step comprising acquiring geographical condition information of a current location at which the positioning control device is present;

a satellite identification step comprising identifying a positioning satellite allowed to be captured at the current location based on the geographical condition information of the current location and satellite arrangement information of each of a plurality of positioning satellites;

a positioning time acquisition step comprising acquiring, when the receiving unit is turned OFF, a predicted positioning time which is a time required for positioning with a radio wave from the positioning satellite identified in the satellite identification step, from a time that the receiving unit is turned ON; and a receiving unit control step comprising turning ON the receiving unit at a timing based on the predicted positioning time acquired in the positioning time acquisition step.

10. The positioning control method according to claim 9, wherein the geographical condition acquisition step acquires a traveling direction and an obliquity in movement of the positioning control device.

11. The positioning control method according to claim 9, wherein the geographical condition acquisition step acquires a traveling direction and an obliquity of the positioning control device, and wherein the satellite identification step acquires a range corresponding to a blind area in capturing of the positioning satellites based on an obliquity of the traveling direction and satellite arrangement information.

12. The positioning control method according to claim 9, wherein the receiving unit control step controls turning ON/OFF of the receiving unit based on the positioning satellite identified in the satellite identification step.

13. The positioning control method according to claim 9, wherein the receiving unit control step controls turning ON/OFF of the receiving unit based on at least one of: the positioning satellite identified in the satellite identification step, and a range corresponding to a blind area in capturing of the positioning satellites.

14. The positioning control method according to claim 9, further comprising:

a position information acquisition step of acquiring position information of a current position based on the radio wave from the positioning satellite received by the receiving unit.

15. A non-transitory computer-readable recording medium having stored thereon a program which, when executed by a computer including a receiving unit that receives a radio wave from a positioning satellite, causes the computer to execute processes comprising:

a geographical condition acquisition process of acquiring geographical condition information of a current location at which the positioning control device is present, a satellite identification process of identifying a positioning satellite allowed to be captured at the current location based on the geographical condition information of the current location and satellite arrangement information of each of a plurality of positioning satellites, a positioning time acquisition process of acquiring, when the receiving unit is turned OFF, a predicted positioning time which is a time required for positioning with a radio wave from the positioning satellite identified by the satellite identification process, from a time that the receiving unit is turned ON, and a receiving unit control process of turning ON the receiving unit at a timing based on the predicted positioning time acquired in the positioning time acquisition process.

\* \* \* \* \*